United States Patent
Schuessler

[19]

[11] Patent Number: 5,818,356
[45] Date of Patent: Oct. 6, 1998

[54] METHOD AND DEVICE FOR GUIDING VEHICLES AS A FUNCTION OF THE TRAFFIC SITUATION

[75] Inventor: Robert Schuessler, Stuttgart, Germany

[73] Assignee: Daimler-Benz AG, Stuttgart, Germany

[21] Appl. No.: 735,985

[22] Filed: Oct. 25, 1996

[30] Foreign Application Priority Data

Oct. 25, 1995 [DE] Germany .................. 195 39 641.3

[51] Int. Cl.$^6$ .................................................. G08G 1/123
[52] U.S. Cl. ..................... 340/995; 340/905; 340/988; 340/994; 364/449.4
[58] Field of Search .................... 340/995, 990, 340/988, 905, 994; 364/424.8, 449.4; 379/58, 59

[56] References Cited

U.S. PATENT DOCUMENTS

| | | | |
|---|---|---|---|
| 5,182,555 | 1/1993 | Sumner | 340/995 |
| 5,187,510 | 2/1993 | Yoneyama et al. | 340/994 |
| 5,317,311 | 5/1994 | Martell et al. | 340/905 |
| 5,402,117 | 3/1995 | Zijderhand | 340/988 |
| 5,406,490 | 4/1995 | Braegas | 340/905 |
| 5,428,545 | 6/1995 | Maegawa et al. | 364/449.4 |

FOREIGN PATENT DOCUMENTS

| | | |
|---|---|---|
| 0 103 847 | 3/1984 | European Pat. Off. . |
| 0 379 198 | 7/1990 | European Pat. Off. . |
| 0 485 120 | 5/1992 | European Pat. Off. . |
| 61-213718 | 9/1986 | Japan . |
| 63-187931 | 8/1988 | Japan . |
| 2-2498 | 1/1990 | Japan . |
| WO 90/02391 | 3/1990 | WIPO . |
| WO 96/00373 | 1/1996 | WIPO . |

OTHER PUBLICATIONS

French Search Report.

*Primary Examiner*—Jeffery A. Hofsass
*Assistant Examiner*—John Tweel, Jr.
*Attorney, Agent, or Firm*—Evenson, McKeown, Edwards & Lenahan, P.L.L.C.

[57] ABSTRACT

A method and a device for vehicle guidance as a function of the traffic situation is provided, during which vehicle guidance the traffic situation data are evaluated in a control center which has a computer. The control center computer determines the optimum route as a function of starting data, the traffic situation data and stored road network data in the form of sequences of intermediate destinations such that a vehicle-end navigation device is capable of reproducing successive sections of the optimum route and issuing the associated guidance instructions by using a traffic situation-independent route search method. This system permits a traffic situation-dependent vehicle guidance in which the more costly route optimization tasks are performed by the control center computer. The vehicle-end navigation computer only has to carry out traffic situation-independent route finding tasks.

12 Claims, 2 Drawing Sheets

METHOD AND DEVICE FOR GUIDING VEHICLES AS A FUNCTION OF THE TRAFFIC SITUATION

BACKGROUND AND SUMMARY OF THE INVENTION

The invention relates to a method for computer-supported vehicle guidance as a function of the traffic situation, in which method the traffic situation data used for guiding the vehicle are made available in a control center and are used to determine optimum routes. The invention further relates to a device which is suitable for carrying out this method.

Various systems are already known for computer-supported vehicle guidance. Firstly, there are navigation systems which operate completely autonomously in the vehicle. A navigation device having a navigation computer, a road network memory which can be read out by the computer and a navigation sensor system which is connected to the navigation computer are provided in these systems at the vehicle end. By means of the navigation sensor system, the navigation computer determines the present location of the vehicle. After a destination has been entered, the computer determines, by reference to the road network stored in the road network memory, the optimum route between the present location of the vehicle or a starting location which has been entered and a destination which has been entered. By reference to the optimum route which has been determined, the navigation device outputs appropriate optical and/or audible guidance information for the vehicle driver. Such a system is described for example in the German patent document DE 36 09 288 C2. A similar system in which, in addition to one-way streets and long-term roadworks, speed limits, stop signs or regular blockages are taken into account in the stored road network data, is described in the periodical article "IAA '93: Elektronik für den Verkehr [Electronics for traffic applications]", Funkschau 24/1993, page 60.

This method of determining the route solely by reference to the quasi-static road network data and by generating appropriate guidance information in the form of optically and/or audibly output instructions to turn-off, etc. can prove not to be the best method when the respective current traffic situation is taken into account, for example owing to the temporary occurrence of accidents, roadworks or traffic jams. More recent efforts are therefore aimed at implementing dynamic guidance systems, i.e. those which also include the respective current traffic situation in the determination of the route.

In German patent document DE 43 01 875 A1, a navigation system which operates completely autonomously of the vehicle is disclosed. In this navigation system, the driver of the vehicle can enter locations which are to be bypassed, after which the navigation system determines the optimum route between the starting location and the destination in which these locations are bypassed as desired.

In the German patent document DE 42 14 067 C2, a method is described for monitoring the transportation of goods at predetermined acceptance points with automatic determination of the respectively travelled route and detection of the same in an on-board computer. An individual route plan which contains acceptance points is stored in a computer of a central monitoring facility for each vehicle. This plan is transmitted to the respective on-board computer and stored as a desired route. If the on-board computer determines an excessively large deviation of the actual route from the desired route, it informs the central computer via a data radio link, after which the latter produces a backup route plan and transmits it to the on-board computer.

In German patent document DE 41 39 581 A1, a navigation method is disclosed for motor vehicles, in which method the information relating to the starting location and destination is transmitted from the vehicle to a central control point by a communication device, after which the central control point determines an optimum route and transmits a corresponding travel recommendation to the motor vehicle via the communication device. A navigation device which may be provided in the vehicle then serves to display the respective location on the route determined by the central control point.

In a vehicle navigation system disclosed in the patent document CH 545 511, the route calculation also takes place solely in a traffic control center which, for this purpose, receives the necessary starting information and destination information from the driver. The route information determined by the traffic control center is then transmitted to a vehicle-end pilot device with a memory, for example a multitrack magnetic tape device so that the driver of the vehicle continuously receives the required information on the best possible route as he travels, for example by virtue of the fact that the magnetic tape device is wound on as a function of the distance covered. Here, marker points in the road network are stored in the control center computer together with identifying numbers which are provided in a clearly visible fashion at the corresponding points in the actual road network, for example with relatively large illuminated numerals of a specific color. For the sake of orientation, the driver carries a road map with him in the vehicle on which the identifying numerals of the various marker points are entered.

A further guidance system in which the determination of optimum routes takes place in a control center has been developed for example by Siemens with the designation "Euroscout", see the periodical article "Verkehrs-Management: Ein neuer Schlüsselmarkt [Traffic management: a new key market]", Funkschau 23/1993, pages 46 to 50. In this system, an exchange of data between a respective vehicle terminal and transmitting and receiving devices which are arranged along the road network which can be used by the vehicle. The devices have a data-exchanging connection to the traffic control center. Via this data-transmission link, a computer in the control center receives data on the traffic flow anonymously from the respective vehicle and calculates and continuously transmits travel-direction information which has been optimized as a function of the traffic situation and which relates in a vehicle-unspecific and destination-unspecific way in each case to a road network environment of each of the transmitting and receiving devices on the road network, to all the vehicles which are involved in the system. The respective vehicle-end terminal does not have a road network memory nor a navigation sensor system but rather a processing unit which selects from the received travel-direction data those data which are relevant to reaching the destination which is known to the unit. The vehicle end terminal then issues to the driver of the vehicle optical and audible direction instructions which guide him to the destination.

An alternative possibility with such a system is to transmit the traffic situation information, present in collective form at the control center, also via the so-called GSM mobile radio network or via the so-called RDS TMC traffic radio channel, to a respective vehicle-end navigation device which determines from this information the optimum route in terms of the traffic situation.

Additionally taking into account the present traffic situation makes more demanding requirements of the vehicle-end components which are involved in determining the route. On the one hand, a standardized form of geometric encoding is required for the stored road network in order to be able to assign all the received traffic situation information geographically to a respective position in the stored road network in an unambiguous way. On the other hand, the respectively occurring traffic situation information has to be evaluated continuously with respect to the consequences for the currently optimum route and complex route optimization tasks have to be carried out in real-time. This requires high-speed data memories and powerful computers. In the above-mentioned known system with dynamic vehicle guidance, these requirements have to be fulfilled entirely by the vehicle-end navigation device, which requires relatively high outlay for the navigation device of each vehicle.

There is therefore needed a method and a device of the type mentioned above which permits, with comparatively little outlay, reliable vehicle guidance which takes into account the respective current traffic situation.

These needs are met by a method for vehicle guidance as a function of the traffic situation, in which method the traffic situation data used for guiding the vehicle are made available in a control center and are used to determine optimum routes. The method operates by (1) transmitting necessary vehicle-specific starting data to the control center; (2) determining an optimum route as a function of the starting data, the traffic situation data and stored road network data, and determining intermediate destinations, located on the optimum route, by means of a computer in the control center such that each section of the optimum route located between every two successive intermediate destinations can be reproduced unambiguously by a vehicle-end navigation device by a traffic situation-independent route search method; (3) transmitting the intermediate destination data from the control center to the vehicle-end navigation device; and (4) successively determining the successive sections of the optimum route between every two successive intermediate destinations by the traffic situation-independent route search method with a respective intermediate destination as the starting point and a subsequent intermediate destination as the end point of the respective route section, and (5) generating associated guidance instructions by the vehicle-end navigation device.

The device includes a control center with a control center computer which has access to traffic situation data which have been made available; a vehicle-end navigation device with a navigation computer, a road network memory which can be read out from the navigation computer and a navigation sensor system which is connected to the navigation computer; and a data communication link between the control center and the vehicle-end navigation device. A road network memory which can be read out by the control center computer is provided in the control center. The control center computer is designed to determine an optimum route as a function of vehicle-specific starting data, the traffic situation data which have been made available and the stored road network data, and to determine intermediate destinations located on the optimum route, such that every section of the optimum route located between every two successive intermediate destinations can be reproduced unambiguously by the vehicle-end navigation device by a traffic situation-independent route search method. The data communication link is configured to transmit the starting data to the control center and the intermediate destination data from the control center to the vehicle-end navigation device. The vehicle-end navigation device is designed to determine successively the successive sections of the optimum route between every two successive intermediate destinations by the traffic situation-independent route search method with a respective intermediate destination serving as the starting point and a subsequent intermediate destination as the end point, and to generate the associated guidance instructions.

With this method and device, the determination of the respective optimum route for all the vehicles involved in this system is carried out in a vehicle-specific and destination-specific fashion in the traffic control center which, for this purpose, is equipped with a suitable computer. Since this route-determining computer is located in the control center and not in a respective vehicle, it can be easily adequately dimensioned, for example, as a mainframe system, such that it is capable of carrying out the necessary route-determining tasks for all the vehicles involved in real time.

After an optimum route has been determined, one possibility which arises is to allow the control center computer also to generate the associated guidance instructions and transmit them to the vehicle by data communication, but this requires costly communication infrastructure, for example in the form of roadside beacons and numerous communication procedures between the control center and the respective vehicle. Therefore, according to the invention a provision is made for a vehicle-end navigation device to be retained and for intermediate destinations to be determined by the control center computer and for the corresponding intermediate destinations to be transmitted to the vehicle-end navigation device such that the latter is capable of reproducing the optimum route unambiguously by reference to the intermediate destinations and the road network stored in it without the vehicle-end navigation computer needing to take into account data on the current traffic situation. Therefore, in terms of its powerfulness, the computer can remain restricted to the conventional determination of the route based purely on the road network and consequently can be easily dimensioned to its accommodation in the vehicle. Furthermore, for guidance purposes, it is not necessary to transmit traffic situation information to the vehicles, instead this information is contained implicitly in the selection of the intermediate destinations which is performed by the control center computer. By reference to the intermediate destinations which are transmitted, the vehicle-end navigation computer is capable of successively reproducing the individual sections of the route, which is optimum in terms of the traffic situation, between every two successive intermediate destinations, and thus ultimately reproducing the entire course of this optimum route which is determined in advance by the control center computer. The computer respectively generates the associated guidance instructions. This ensures that instead of all the data which specify the optimum route, only the intermediate destination data have to be transmitted from the control center to the vehicles, and no additional guidance instruction data.

In the method, it is an advantage that the quantity of data which is transmitted from the control center to the respective vehicle is minimized in that only the minimum quantity of intermediate destinations which is necessary for unambiguously reproducing the optimum route by means of the vehicle-end navigation computer is determined and transmitted.

Advantageous variants for activating a respective vehicle guidance procedure according to the guidance method according to the invention are also provided.

In a further advantageous vehicle guidance device, a mobile radio link serves for data communication between the control center and the vehicles involved.

Other objects, advantages and novel features of the present invention will become apparent from the following detailed description of the invention when considered in conjunction with the accompanying drawings.

DETAILED DESCRIPTION OF THE DRAWINGS

Figure 1:
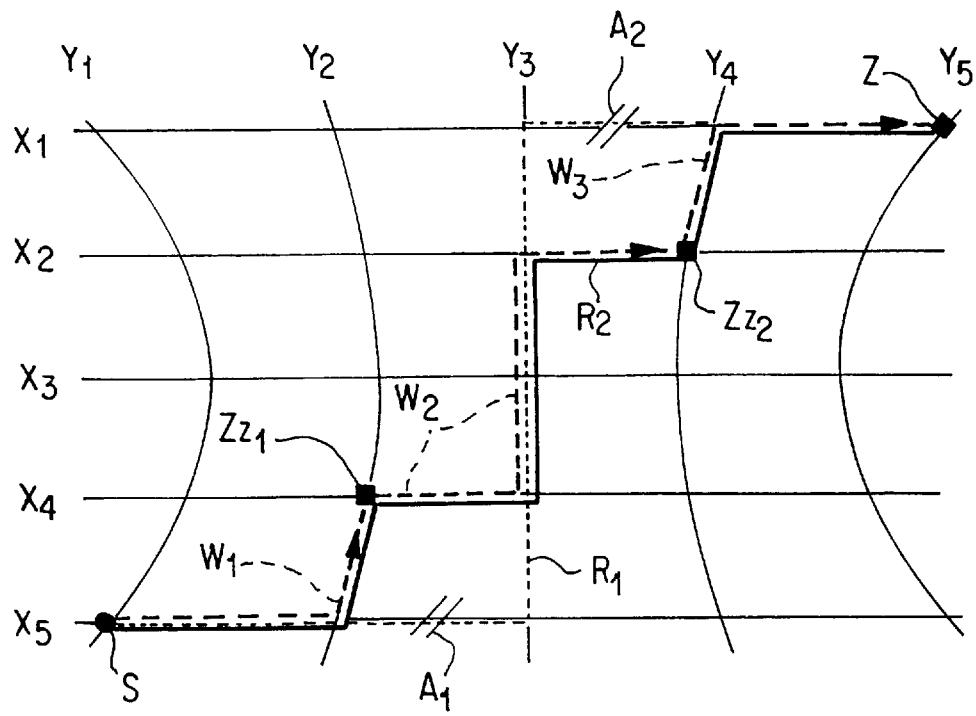
FIG. 1 graphically shows a schematic route diagram for illustrating a vehicle guidance procedure which is dependent on the traffic situation.
Figure 2:
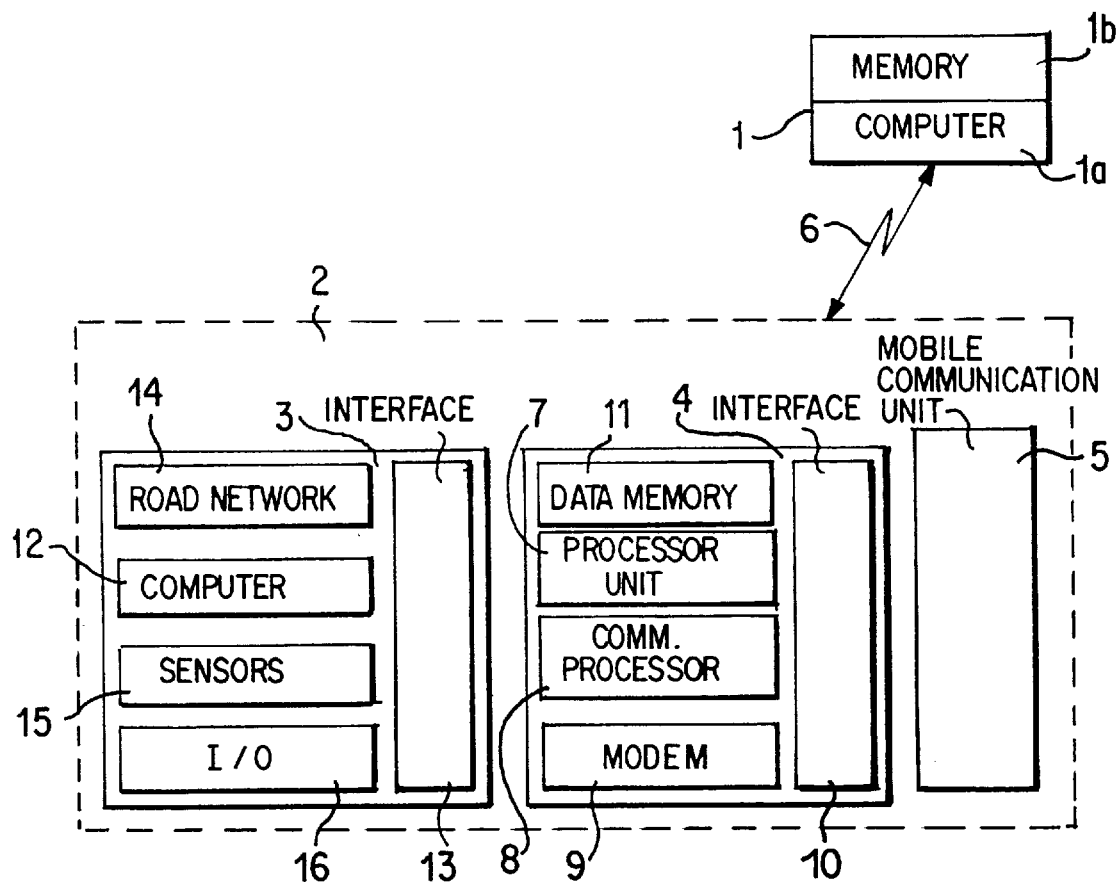
FIG. 2 is a schematic block diagram of a device for vehicle guidance as a function of the traffic situation.
Figure 3:
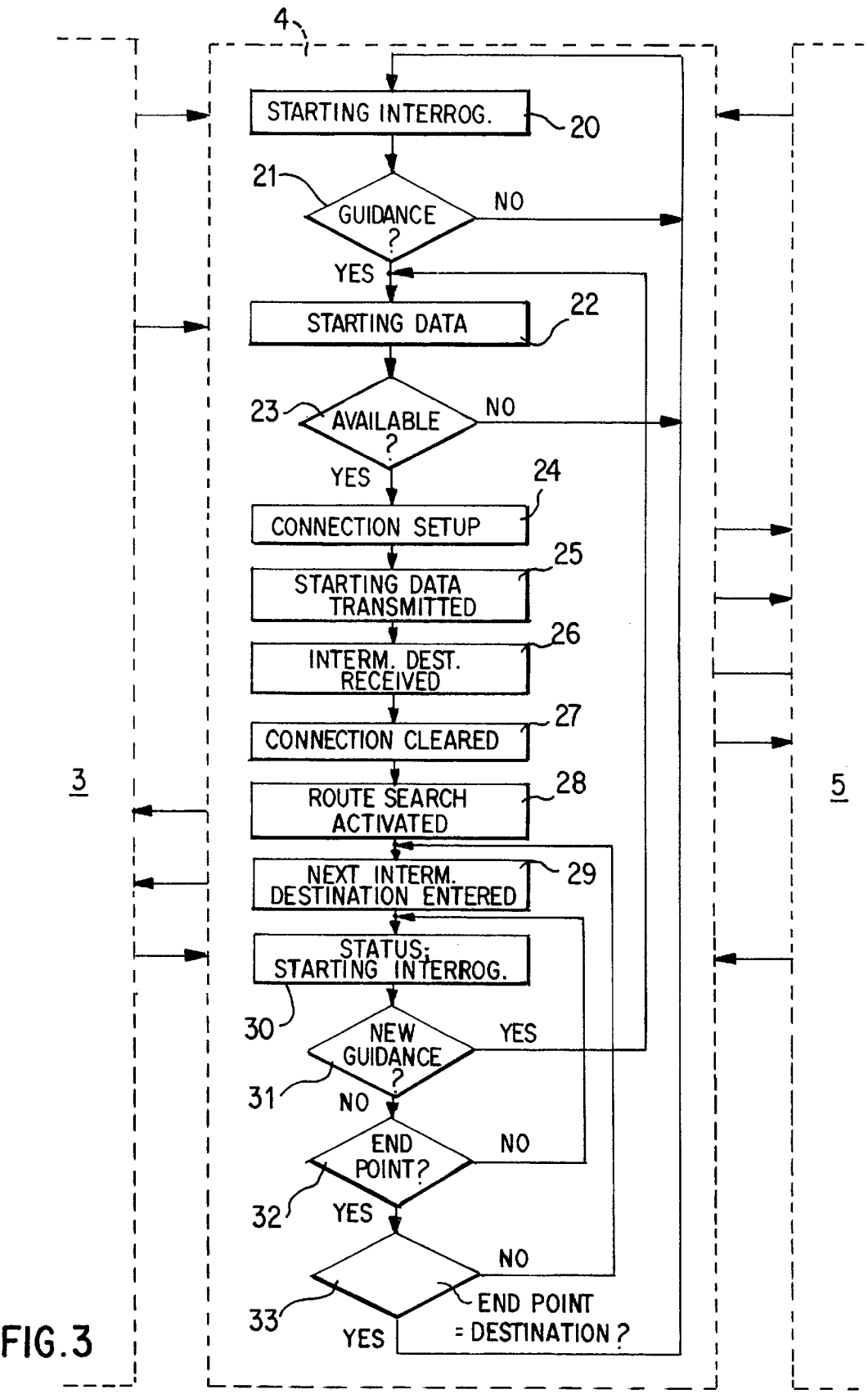
FIG. 3 is a program flow chart of the vehicle guidance method which can be executed by the device in FIG. 2.

FIG. 1 illustrates the method of operation of the device in FIG. 2, which device operates according to the method sequence in accordance with FIG. 3 by means of a route diagram. The guidance is based on a stored road network indicated by a two-dimensional coordinate system. In FIG. 1, the two-dimensional coordinate system has five x-coordinate curves ($x_1$ to $x_5$) and five y-coordinates curves ($y_1$ to $y_5$). In the example in FIG. 1, there is a vehicle at a starting location (S) with the coordinates ($x_5$, $y_1$). The driver of the vehicle specifies as destination (Z) the location with the coordinates ($x_1$, $y_5$). It is to be assumed that, without taking into account the current traffic situation, the route ($R_1$) shown by a dotted line in FIG. 1 would be obtained as the optimum route which results from a corresponding standard route search method as the geometrically shortest and/or fastest route between the starting location (S) and the destination (Z) along the stored road network. Furthermore, it would be assumed that along this route ($R_1$), which is optimum independently of the traffic situation, there is a traffic problem at each of two route sections ($A_1$, $A_2$) marked by a double slash. As a result, the geometrically shortest and/or fastest route ($R_1$) is no longer the most convenient route, instead a modified route ($R_2$) whose assumed course is illustrated as a continuous line in FIG. 1 proves to be the route which is the optimum one in terms of the traffic situation.

In addition to the starting location (S) and the destination (Z), which do not in fact constitute intermediate destinations, precisely as many actual intermediate destinations are determined as are necessary for the unambiguous reproduction of the route ($R_2$) which is optimum in terms of the traffic situation, by means of successive traffic situation-independent standard route search procedures in accordance with the principle of the geometrically shortest and/or fastest connection between, in each case one intermediate destination serving as the starting point and a subsequent intermediate destination as an end point. The intermediate destinations are those which lie between the starting location (S) and the destination (Z) along this route which is optimum in terms of the traffic situation. In the example in FIG. 1, there are two intermediate destinations ($Zz_1$, $Zz_2$). In this way, the individual sections ($W_1$, $W_2$, $W_3$) of the route which is optimum in terms of the traffic situation, in each case can be determined successively by reference to the stored road network and the data on the intermediate destinations (S, $Zz_1$, $Zz_2$, Z) using a standard route search method operated by a vehicle navigation system. The sections lie between two intermediate destinations (S, $Zz_1$, $Zz_2$, Z). The navigation system is comparatively simple because it operates independently of the traffic situation, thus permitting the vehicle to be guided to the desired destination (Z) along the route, which is the optimum one taking into account the present traffic situation, supported by appropriate guidance instructions of the vehicle-end navigation system.

FIG. 2 shows a device which is suitable for such guidance. It contains a traffic control center (1) with a control center computer (1a) which has, in particular, access to an electronic memory (1b) in which data of a road network which serves as a basis, data on incoming traffic problem reports and, depending on the application, further data, are stored. Further conventional components which are provided in the control center are not represented in detail for the sake of simplicity. The control center computer (1a) is configured in such a way that it is capable of determining routes in a dynamic manner, i.e. traffic situation-dependent fashion in real-time, for all the vehicles involved, taking into account the current traffic situation.

Each vehicle (2) involved, symbolized in FIG. 2 as a block of dashed lines, contains a navigation device which is composed of a navigator (3), a navigator control unit (4) and a mobile communication unit (5). The navigator control unit (4) controls the functional sequence in the navigator (3) and can either be configured as a separate system unit or as a system unit which is integrated into the navigator (3). Each vehicle-end navigation device has a bidirectional data-exchanging connection to the control center (1) via the mobile communication unit (5) of the navigator (3) and via a mobile radio link (6). The navigator control unit (4) contains a controlling processor unit (7) which is connected to the mobile communication unit (5) via a communication processor (8) which forms the vehicle-end unit for processing the data communication procedures, as well as via a modem (9) for the A/D and D/A conversion of the data and an interface (10). Furthermore, the navigator control unit (4) has a data memory (11), connected to the processor unit (7), for storing data relating to the destination (Z) entered by the driver, data relating to the actual intermediate destinations ($Zz_1$, $Zz_2$) which are each transmitted by the control center (1), data relating to the availability of the control center (1), and data for the connection setup to the control center (1).

The navigator (3) contains a navigation computer (12) which is connected via an interface (13) to the processor unit (7) of the navigator control unit (4), as well as a road network memory (14) to which the navigation computer (12) has access and in which the road network on which the vehicle can travel is stored in coordinate form. Furthermore, the navigator (3) has a navigation sensor system (15) via which it determines the present position of the vehicle, as well as an input/output unit (16) for optically and/or audibly outputting guidance instructions, such as instructions to turn-off etc., and for the user to enter data, e.g. the destination data. Via the connection of the navigation computer (12) to the controlling processor unit (7), the navigation computer (12) transmits to the navigation control unit (4) data relating to the type identification of the navigator (3) and of the road network stored in the road network memory (14), data relating to the entered destination (Z), the present position of the vehicle as a starting location (S) and relating to requests, possibly generated by the navigator (3) itself or entered by the driver via the input/output unit (16), for activating a guidance procedure, and relating to an item of information indicating that the destination (Z) has been reached. The processor unit (7) of the navigation control unit (4) controls the guidance procedure with reference to these data, which involves in particular the successive feeding of the data relating to the individual intermediate destinations ($Zz_1$, $Zz_2$) to the navigation computer (12) and the activation of the individual standard route search procedures by the navigation computer (12) on a section-by-section basis between every two intermediate destinations (S, $Zz_1$, $Zz_2$, Z).

The sequence of the vehicle guidance method which can be carried out by the device according to FIG. 2 is illustrated in FIG. 3. The method sequence is controlled mainly by the navigator control unit (4) which is indicated by broken lines in FIG. 3. At corresponding points of the method sequence, data communication procedures of the navigator control unit (4) take place with the control center (1) on the one hand with the navigator (3) (which is symbolized by dotted lines) and, on the other hand, via the mobile communication unit (5) (which is likewise symbolized by dotted lines). The data communication procedures are represented in each case by means of corresponding direction arrows.

In an initiating step (20), the navigator control unit (4) possibly receives a request for carrying out a guidance procedure from the navigator (3) or from the control center (1). Such a guidance activation can be requested in different ways if the vehicle is moving in a region or on a road network for which guidance via the control center (1) is available. It is possible, if appropriate, for a plurality of control centers to be distributed in large areas over the region of the road network which can be used by the vehicle. Possible variants for the requesting of a guidance procedure are in particular for such an activity to be triggered automatically by the navigator (3) whenever a journey is begun and/or at regular time intervals during the journey and/or in an event-dependent way during the journey, in particular if route-relevant traffic information is received in the vehicle via a traffic radio channel. Alternatively, the guidance procedure can be triggered automatically by the control center (1) in an event-dependent fashion during the journey when route-relevant traffic information is received in the control center (1), or it can be triggered at the request of the driver of the vehicle. The navigator control unit (4) receives guidance requests from the control center (1) via the mobile radio link (6) and the mobile communication unit (5). If the existence of a guidance request is detected in the subsequent request interrogation step (21), the system goes over to a subsequent step (22) in which the navigator control unit (4) reads in, from the navigator (3), data relating to the destination (Z), the starting location (S) and the type identification of the navigator (3) and its road network memory (14).

In the subsequent step (23), there is an interrogation as to whether the vehicle guidance service of the control center (1) is available. If not, the system jumps back to the start of the method. If the service is available, a connection to the control center (1) is established next (step 24). In the next step (25), the starting data, i.e. the data relating to the destination (Z), starting location (S) and the type of navigator and type of road network memory, previously received by the navigator (3) are transmitted to the control center (1). Then, the control center computer (1a) determines, taking into account these data as well as the traffic situation data made available in the control center (1) and the stored road network data, the presently optimum route ($R_2$) in terms of the traffic situation, between the starting location (S) and destination (Z), as indicated above with respect to FIG. 1. Furthermore, it determines the minimum quantity of actual intermediate destinations ($Zz_1$, $Zz_2$) which are at least required for the section-by-section, unambiguous reproduction of this route ($R_2$), which is optimum in terms of the traffic situation, via the vehicle-end navigation computer (12) by means of standard route search procedures, carried out independently of the traffic situation, between every two successive intermediate destinations (S, $Zz_1$, $Zz_2$, Z). The data of the actual intermediate locations ($Zz_1$, $Zz_2$) thus implicitly contain the information for bypassing possible traffic problems between the starting location (S) and destination (Z).

Of course, the control center computer (1a) performs the determination of the route ($R_2$) which is optimum in terms of the traffic situation, and in particular the selection of the actual intermediate destinations ($Zz_1$, $Zz_2$) in a way which is suitable for the respective type of the navigator (3) used at the vehicle end and of the road network stored at the vehicle end in the respective memory (14), for which purpose the corresponding type identification data are fed to it. The control center computer (1a) determines the route which is respectively the most favorable at that time in terms of the traffic situation in real-time, the transmission of the relatively large quantity of data which specifies this optimum route unambiguously, from the control center (1) to the respective vehicle (2) being then dispensed with and, instead, in a subsequent step (26), only the data of the actual intermediate destinations ($Zz_1$, $Zz_2$) which are specifically determined for the vehicle-end navigation device are transmitted to the vehicle (2). The data are received by the navigator control unit (4) and stored in its data memory (11). Then, the navigator control unit (4) clears the connection to the control center (1) (step 27). At this point, a cost determination for the route optimization carried out by the control center (1) can additionally take place as a function of the intensity of use of the mobile radio link (6) and/or of the control center computer (1a).

In the next step (28), the navigator control unit (4) switches the navigator (3) to standard route search which consists in the navigation computer (12) determining the intermediate, most favorable route by means of a respectively prescribed starting point and end point according to a conventional traffic situation-independent route optimization principle, e.g. according to the principle of the geometrically shortest path within the road network or the shortest travel time taking into account different road categories such as motorways, trunk roads etc. For this purpose, a respectively following intermediate destination ($Zz_1$, $Zz_2$, ..., Z) is prescribed to the navigator (3) as the end point for the new standard route search procedure to be carried out (step 29). In the first method run of a guidance procedure, this is the first actual intermediate destination ($Zz_1$) while the starting location (S) serves as the starting point. In the respective subsequent run, the preceding end point serves as the starting point and the intermediate destination following this serves as the new end point. The navigator (3) then determines the most favorable route between the starting point and end point by means of the standard route search and thus reproduces the respective section ($W_1$, $W_2$, ...) of the route ($R_2$) which is optimum in terms of the traffic situation. In addition, it generates the optical and/or audible guidance instructions which are associated with the respective route section ($W_1$, $W_2$, ...) and outputs them for the driver of the vehicle.

After the respective section ($W_1$, $W_2$, ...) of the optimum route ($R_2$) has been determined, the navigator control unit (4) evaluates the navigator status data and detects, via their communication channels, the possible presence of a current, new guidance request on the part of the navigator (3), the control center (1) or the driver of the vehicle (step 30). If the presence of an updated guidance request is detected in the subsequent interrogation step (31), the method returns to before step (22) in which the navigator control unit (4) reads out from the navigator (3) the starting data made available by it. If no new guidance is requested, it is tested next (step 32) whether an item of information indicating that the vehicle has reached the intermediate destination prescribed as the end point for the respective standard route search procedure by the navigation computer (12) is received by the navigator (3). As long as this is not the case, the system returns to the status and request-detection step (30) in a loop.

As soon as the vehicle has reached the respective end point of the route section presently travelled over by means of the guidance instructions from the navigator (3), i.e. the first actual intermediate destination ($Zz_1$) in the first method run, the second actual intermediate destination ($ZZ_2$) in the second run etc., and this has been reported to the navigator unit (4) by the navigator (3), it is interrogated (step 33) whether this end point corresponds to the prescribed destination (Z). As long as this is not the case, the method returns before the step (29) in order to enter the next intermediate destination and carry out a subsequent run of the standard route search during which the previous end point functions as the starting point and the next entered intermediate destination functions as the new end point for the reproduction of the next section ($W_2, W_3, \ldots$) of the route ($R_2$) which is optimum in terms of the driving situation. This sequence is repeated until, in the last-mentioned interrogation step (33), it is determined that the end point corresponding to the present location of the vehicle is the destination (Z) desired by the driver, that is to say, in the respective last method run, the destination (Z) has been reached in that the last section ($W_3$) of the route ($R_2$) which is optimum in terms of its traffic situation, between the last actual intermediate destination ($Zz_2$) and the destination (Z) has been reproduced by the navigator (3), and the associated guidance instructions have been output. Then, the method sequence can be restarted by again entering a new destination.

The above description of a preferred exemplary embodiment shows that, by using the method according to the invention and the device according to the invention, a vehicle guidance which is dynamic, i.e. dependent as a function of the respectively currently present traffic situation can be realized, for which vehicle guidance only one conventional navigation device is required at the vehicle end. The navigation device only needs to be able to determine, by means of a standard route search method, the route which is most favorable on the basis of a stored road network between a starting point and an end point without taking into account the current traffic situation. The more costly traffic situation-dependent route determination is, for all the vehicles involved, moved into one or more control centers which are equipped with sufficiently powerful computers which are capable of carrying out the route-optimization tasks without difficulty in real-time. Moreover, the control center computer determines, adapted to the respectively present vehicle-end navigation device, intermediate destinations between the starting location and the destination on the optimum route which has been determined. This is done such that the route can be successively reproduced in successive sections by the vehicle-end navigation device by using a route search method which is independent of the traffic situation and thus less costly. The control center computer preferably only determines the intermediate destinations which are at least required for the unambiguous reproduction of the optimum route and transmits them to the respective vehicle. The vehicle-end navigation device produces, section-by-section, from the said intermediate destinations, the optimum route between the respective intermediate destinations and generates the associated guidance instructions which therefore do not need to be generated by the control center computer and transmitted to the respective vehicle. This dividing up, according to the invention, of the guidance tasks between the control center on the one hand and the vehicle-end navigation device on the other keeps the outlay on data transmission to a minimum and utilizes the efficiency of the conventional navigation computers accommodated at the vehicle end, without burdening those navigation computers with traffic situation-dependent route-optimization tasks.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for guiding a vehicle as a function of a traffic situation, in which traffic situation data used for guiding the vehicle are made available in a control center and are used to determine optimum routes, the method comprising the steps of:

transmitting necessary vehicle-specific starting data to said control center;

determining an optimum route ($R_2$) as a function of said starting data, said traffic situation data and stored road network data;

determining intermediate destinations ($Zz_1, Zz_2, \ldots$), located on said optimum route, using a computer in said control center such that each section ($W_1, W_2, \ldots$) of said optimum route located between every two successive ones of said intermediate destinations can be reproduced unambiguously by a vehicle-end navigation device located in the vehicle using a traffic situation-independent route search method;

transmitting said intermediate destination data from said control center to said vehicle-end navigation device;

successively determining with the vehicle-end navigation device successive ones of said sections ($W_1, W_2, \ldots$) of said optimum route ($R_2$) between every two successive ones of said intermediate destinations by using said traffic situation-independent route search method, wherein a respective intermediate destination (S, $Zz_1$, $Zz_2, \ldots$) is used as a starting point and a subsequent intermediate destination ($Zz_1, Zz_2, \ldots Z$) as an end point of a respective route section; and generating associated guidance instructions by said vehicle-end navigation device.

2. The method according to claim 1, wherein said control center computer determines a minimum quantity of said intermediate destinations ($Zz_1, Zz_2, \ldots$) which is sufficient for the unambiguous reproduction of the optimum route ($R_2$) in terms of the traffic situation by the vehicle-end navigation device using its traffic situation-independent route search method, and transmits the said minimum quantity to the vehicle-end navigation device.

3. The method according to claim 1, wherein activation of a guidance procedure is triggered automatically by at least one of the vehicle-end navigation device whenever a journey is begun and at regular time intervals and in an event-dependent way during the journey, or is triggered automatically by the control center in an event-dependent fashion during the journey or is triggered in response to a driver request.

4. The method according to claim 2, wherein activation of a guidance procedure is triggered automatically by at least one of the vehicle-end navigation device whenever a journey is begun and at regular time intervals and in an event-dependent way during the journey, or is triggered automatically by the control center in an event-dependent fashion during the journey or is triggered in response to a driver request.

5. A device for guiding a vehicle as a function of a traffic situation, comprising:

a control center with a control center computer which has access to traffic situation data which have been made available;

a vehicle-end navigation device with a navigation computer, a road network memory which can be read out from the navigation computer, and a navigation sensor system which is connected to the navigation computer;

a data communication link between said control center and said vehicle-end navigation device; and a control center road network memory provided in the control center, said control center road network memory being read out by said control center computer, wherein the control center computer determines an optimum route ($R_2$) as a function of vehicle-specific starting data, the traffic situation data which have been made available, and the stored road network data, and determines intermediate destinations ($Zz_1, Zz_2, \ldots$) located on the optimum route, such that every section ($W_1, W_2, \ldots$) of the optimum route located between every two successive intermediate destinations is reproduced unambiguously by the vehicle-end navigation device by a traffic situation-independent route search method, wherein the data communication link is configured to transmit the starting data to the control center and the intermediate destination data from the control center to the vehicle-end navigation device, and wherein the vehicle-end navigation device is located in the vehicle and is designed to determine successively the successive sections ($W_1, W_2, \ldots$) of the optimum route ($R_2$) between every two successive intermediate destinations (S, $Zz_1, Zz_2, \ldots$ Z) by the traffic situation-independent route search method with a respective intermediate destination (S, $Zz_1, Zz_2, \ldots$) serving as a starting point and a subsequent intermediate destination ($Zz_1, Zz_2, \ldots,$ Z) as an end point, said vehicle-end navigation device generating associated guidance instructions.

6. The device according to claim 5, wherein the data communication link is formed by a mobile radio link.

7. A method for guiding a plurality of vehicles as a function of a traffic situation, in which traffic situation data used for guiding the vehicles are made available in a control center separate from the vehicles and are used to determine optimum routes, the method comprising the steps of:

transmitting necessary vehicle-specific starting data to said control center from respective vehicles;

determining optimum routes ($R_2$) for respective vehicles as a function of said starting data, said traffic situation data and stored road network data;

determining intermediate destinations ($Zz_1, Zz_2, \ldots$), located on said optimum routes, using a computer in said control center such that each section ($W_1, W_2, \ldots$) of said optimum routes located between every two successive ones of said intermediate destinations can be reproduced unambiguously by respective vehicle-end navigation devices located in the respective vehicles using a traffic situation-independent route search method;

transmitting said intermediate destination data from said control center to said respective vehicle-end navigation devices;

successively determining with the vehicle-end navigation device successive ones of said sections ($W_1, W_2, \ldots$) of said optimum routes ($R_2$) between every two successive ones of said intermediate destinations by using said traffic situation-independent route search methods at respective vehicle-end navigation devices, wherein a respective intermediate destination (S, $Zz_1, Zz_2, \ldots$) from said control center is used as a starting point and a subsequent intermediate destination ($Zz_1, Zz_2, \ldots,$ Z) from said control center is used as an end point of a respective route section; and generating associated vehicle guidance instructions by said vehicle-end navigation devices for guiding respective vehicles along said respective sections of said optimum routes.

8. The method according to claim 7, wherein said control center computer determines a minimum quantity of said intermediate destinations ($Zz_1, Zz_2, \ldots$) which is sufficient for the unambiguous reproduction of the optimum routes ($R_2$) in terms of the traffic situation by the vehicle-end navigation devices using their respective traffic situation-independent route search methods, and transmits the said minimum quantity to the respective vehicle-end navigation devices.

9. The method according to claim 7, wherein activation of a guidance procedure is triggered automatically by at least one of the respective vehicle-end navigation devices whenever a journey is begun and at regular time intervals and in an event-dependent way during the journey, or is triggered automatically by the control center in an event-dependent fashion during the journey or is triggered in response to a driver request of a respective vehicle.

10. The method according to claim 8, wherein activation of a guidance procedure is triggered automatically by at least one of the respective vehicle-end navigation devices whenever a journey is begun and at regular time intervals and in an event-dependent way during the journey, or is triggered automatically by the control center in an event-dependent fashion during the journey or is triggered in response to a driver request of a respective vehicle.

11. A system for guiding vehicles as a function of a traffic situation, comprising:

a control center with a control center computer which has access to traffic situation data which have been made available;

vehicle-end navigation devices at respective vehicles with a navigation computer, a road network memory which can be read out from the navigation computer, and a navigation sensor system which is connected to the navigation computer;

data communication links between said control center and said vehicle-end navigation devices; and a control center road network memory provided in the control center, said control center road network memory being read out by said control center computer, wherein the control center computer determines an optimum route ($R_2$) as a function of vehicle-specific starting data, the traffic situation data which have been made available, and the stored road network data, and determines intermediate destinations ($Zz_1, Zz_2, \ldots$) located on the optimum routes of respective vehicles, such that every section ($W_1, W_2, \ldots$) of the optimum route located between every two successive intermediate destinations is reproduced unambiguously by the respective vehicle-end navigation devices by a traffic situation-independent route search method, wherein the data communication links are configured to transmit the respective vehicle starting data to the control center and the respective intermediate destination data from the control center to the respective vehicle-end navigation devices, and wherein the vehicle-end navigation devices are located in the respective vehicles and are designed to determine successively the successive sections ($W_1, W_2, \ldots$) of the respective optimum routes ($R_2$) between every two successive intermediate destinations (S, $Zz_1, Zz_2, \ldots$ Z) by the traffic situation-independent route search method with a respective intermediate destination (S, $Zz_1, Zz_2, \ldots$) serving as a starting point and a subsequent intermediate destination ($Zz_1, Zz_2, \ldots, Z$) as an end point, said vehicle-end navigation devices generating associated guidance instructions for guiding respective vehicles along said respective sections of said optimum routes.

12. The system according to claim 11, wherein the data communication links are formed by mobile radio links.

* * * * *